United States Patent [19]

Lüker

[11] Patent Number: 5,023,388
[45] Date of Patent: Jun. 11, 1991

[54] POLYETHYLENE WAX, AND A PROCESS FOR THE PREPARATION THEREOF

[75] Inventor: Hartmut Lüker, Hofheim am Taunus, Fed. Rep. of Germany

[73] Assignee: Hoechst Aktiengesellschaft, Frankfurt, Fed. Rep. of Germany

[21] Appl. No.: 286,326

[22] Filed: Dec. 19, 1988

[30] Foreign Application Priority Data

Dec. 21, 1987 [DE] Fed. Rep. of Germany ....... 3743322

[51] Int. Cl.$^5$ .................... C10M 101/02; C07C 2/24; C07C 2/02
[52] U.S. Cl. ........................................ 585/9; 585/512; 585/523; 585/522; 585/524
[58] Field of Search .................. 585/9, 512, 523, 522, 585/524

[56] References Cited

U.S. PATENT DOCUMENTS

| 4,542,199 | 9/1985 | Kaminsky et al. | 526/348.5 |
| 4,704,491 | 11/1987 | Tsutsui et al. | 585/512 |
| 4,769,510 | 9/1988 | Kaminsky et al. | 585/512 |

FOREIGN PATENT DOCUMENTS 0021700 1/1981 European Pat. Off. .
62-129303 6/1987 Japan .

OTHER PUBLICATIONS

T. Tsutsui, "Production of Ethylene Wax", Mar. 14, 1987, vol. II, No. 85 (C-416) (2532) (Abstract).

Primary Examiner—H. M. S. Sneed
Assistant Examiner—James Saba

[57] ABSTRACT

Polyethylene waxes having a very narrow molecular weight distribution, high isotacticity, a narrow grain size distribution and a high bulk density are obtained by means of a catalyst comprising a metallocene and an aluminoxane, in the presence of small amounts of hydrogen during the polymerization.

3 Claims, No Drawings

POLYETHYLENE WAX, AND A PROCESS FOR THE PREPARATION THEREOF

DESCRIPTION

The present invention relates to polyethylene waxes having a very narrow molecular weight distribution, a very narrow melting range and a high bulk density, and to a process for the preparation thereof.

Polyethylene waxes are important for a large number of fields of application. In particular, highly crystalline waxes are attracting increasing interest for admixing to produce abrasion-resistant printing inks, for paint flatting and for the preparation of emulsifiable waxes for cleaning materials.

A process is known for the preparation of polyethylene wax which operates in high yield (cf. EP-A 21,700). Nevertheless, disproportionately large amounts of hydrogen are necessary to achieve the low molecular weight desired. In addition, some of the ethylene employed is converted into ethane, thus causing losses of monomer.

In addition, a process has been described for the preparation of oligomers using a catalyst comprising aluminoxane and $MgCl_2 \cdot H_2O$ and $cp_2ZrClH$, but where crystalline waxes of high bulk density are not produced, but instead oligomers with ethylene and 4-methylenepentene (cf. JP 62/129,303).

In addition, the known catalysts for the preparation of polyethylene waxes have the disadvantage that the comonomer is not incorporated randomly, but instead predominantly into the high-molecular-weight or low-molecular-weight component. The object was thus to find a process which gives highly crystalline polyethylene waxes in high yield and efficiency.

It has now been found that the object can be achieved when ethylene is polymerized by means of a metallocene/aluminoxane catalyst in the presence of small amounts of hydrogen.

The invention thus relates to a polyethylene wax comprising or containing units derived from ethylene, having a molecular weight of from about 2,000 to about 10,000, a molecular weight distribution $M_w/M_n$ of from about 2 to 10, a viscosity number of from 10 to 60 $cm^3/g$, a melting range of from about 129° to 131° C. for a homopolymer and about 120° to 126° C. for a copolymer, and a density of from 0.930 to 0.970 $g/cm^3$ and a bulk density of from 200 to 400 $g/cm^3$.

The invention furthermore relates to a process for the preparation of a polyethylene wax by polymerization of ethylene or copolymerization of ethylene with a 1-olefin of the formula $R-CH=CH_2$ in which R denotes a straight-chain or branched alkyl radical having 1 to 12 carbon atoms, at a temperature of from 20° to 100° C., a pressure of from 0.5 to 64 bar, in solution, in suspension or in the gas phase, in the presence of a catalyst comprising a metallocene as the transition-metal component and an aluminoxane as the activator, which comprises carrying out the polymerization in the presence of a catalyst whose transition-metal component is an unsubstituted or substituted cyclopentadienyl complex of titanium, zirconium or hafnium, wherein the aluminoxane is one of the formula I

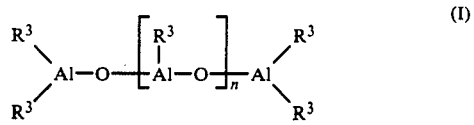

for the linear type and/or of the formula II

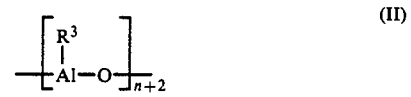

for the cyclic type, where, in the formulae I and II, $R^3$ denotes a $C_1$-$C_6$-alkyl group and n is an integer from 2 to 40, and wherein hydrogen is present in an amount of from 0.1 to 10% by volume, based on ethylene.

The polyethylene wax according to the invention is prepared by polymerization of ethylene or copolymerization of ethylene with 1-olefins in the presence of a catalyst comprising a metallocene as the transition-metal component and an aluminoxane as the activator.

The metallocene is an unsubstituted or substituted cyclopentadienyl complex of titanium, zirconium or hafnium, preferably of zirconium or hafnium.

A suitable metallocene corresponds to the formula
(cyclopentadienyl)$_2$ M R Hal,
in which R is a cyclopentadienyl radical, a $C_1$-$C_6$-alkyl radical or a halogen atom, preferably a chlorine atom, M is titanium, zirconium or hafnium, preferably zirconium, and Hal represents a halogen atom, preferably a chlorine atom.

Further suitable metallocene compounds are complexes $[MX_2(\eta-C_5H_4R^1)_2]$:

| $R^1 =$ | $X =$ | $M =$ | $R^1 =$ | $X =$ | $M =$ |
| --- | --- | --- | --- | --- | --- |
| H | F | Zr | H | Br | Zr |
| H | F | Hf | H | Br | Hf |
| H | Cl | Zr | H | I | Zr |
| H | Cl | Hf | H | I | Hf |
| i-$C_3H_7$ | Cl | Zr | SiMe$_3$* | Cl | Zr |
| i-$C_3H_7$ | Cl | Hf | SiMe$_3$ | Br | Zr |
| i-$C_4H_7$ | Cl | Zr | SiMe$_3$ | Cl | Hf |
| i-$C_4H_9$ | Cl | Hf | SiMe$_3$ | Br | Hf |
| GeMe$_3$ | Cl | Zr | i-$C_3H_7$ | I | Hf |
| GeMe$_3$ | Cl | Hf | i-$C_4H_9$ | I | Hf |
| SiMe$_3$CH$_2$— | Cl | Zr | C(CH$_2$)C$_6$H$_5$ | Cl | Hf |
| P(C$_6$H$_5$)$_2$ | | | | | |

*Me = CH$_3$

| $R^1 =$ | $X =$ | $M =$ | $R^1 =$ | $X =$ | $M =$ |
| --- | --- | --- | --- | --- | --- |
| Menthyl | Cl | Zr | C(CH$_2$)C$_6$H$_5$ | Cl | Hf |
| Neomenthyl | Cl | Zr | (CH$_2$)$_2$P—(C$_6$H$_5$)$_2$ | Cl | Zr |
| i-$C_3H_7$ | Br | Hf | | | |
| i-$C_4H_9$ | Br | Hf | | | |
| [ZrCl$_2$($\eta$-C$_5$Me$_5$)($\eta$-C$_5$H$_5$)] | | | | | |
| [ZrCl$_2$($\eta$-C$_5$Me$_5$)($\eta$-C$_5$H$_2$-1,2,4-Me$_3$)] | | | | | |

Complexes [MCl$_2$($\eta$-C$_5$Me$_4$R$^1$)$_2$]:

| $R^1 =$ | $M =$ | $R^1 =$ | $M =$ |
| --- | --- | --- | --- |
| CH$_3$ | Zr | n-$C_3H_7$ | Zr |
| C$_2$H$_5$ | Zr | n-$C_4H_9$ | Zr |
| [MCl$_2$($\eta$-C$_5$H$_3$(SiMe$_3$)$_2$)$_2$] | | where M = Zr, Hf | |
| [ZrX$_2$($\eta$-C$_5$H$_3$(SiMe$_3$)$_2$)$_2$] | | where X = Br, F, I | |
| [MCl$_2$(($\eta$-C$_5$H$_4$CH$_2$)$_2$CH$_2$)] | | where M = Zr, Hf | |

Complexes [MCl$_2$($\eta$-C$_5$H$_5$)($\eta$-C$_5$H$_4$R$^1$)]:

| $R^1 =$ | $M =$ | $R^1 =$ | $M =$ |
| --- | --- | --- | --- |
| i-$C_3H_7$ | Zr | SiMe$_2$CH$_2$P(C$_6$H$_5$)$_2$ | Zr |
| i-$C_3H_7$ | Hf | SiMeCH$_2$P(C$_6$H$_5$)$_2$.Fe(CO)$_4$ | Zr |
| CH$_2$C$_6$H$_5$ | Zr | C(CH$_2$)C$_6$H$_5$ | Zr |
| CHMeC$_6$H$_5$ | Zr | C(CH$_2$)C$_6$H$_5$ | Hf |

| -continued | |
| --- | --- |
| CMe$_2$C$_6$H$_5$ | Zr |
| CMe$_2$C$_6$H$_5$ | Hf |
| t-C$_4$H$_9$ | Zr |

| Complexes [MXR$^2$($\eta$-C$_5$H$_4$R$^1$)$_2$]: | | | |
| --- | --- | --- | --- |
| R$^1$ = | X = | R$^2$ = | M = |
| H | Br | OH | Zr |
| H | H | OH | Zr |
| H | Cl | OC$_2$H$_5$ | Zr |
| H | Cl | O-i-C$_3$H$_7$ | Zr |
| H | Cl | O-Menthyl(-) | Zr |
| H | Br | O—C$_2$H$_5$ | Zr |
| H | Cl | SiMe$_3$ | Zr |
| H | Cl | Si(C$_6$H$_5$)$_3$ | Zr |
| H | Cl | Si(C$_6$H$_5$)$_3$ | Hf |
| H | SiMe$_3$ | SiMe$_3$ | Zr |

Bis(cyclopentadienyl)dimethylzirconium and bis (cyclopentadienyl)zirconium dichloride are preferably used.

The second component of the catalyst to be used according to the invention is an aluminoxane of the formula

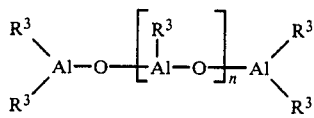
(I)

for the linear type and/or of the formula II

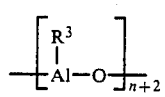
(II)

for the cyclic type. In these formulae, R$^3$ denotes a C$_1$-C$_6$-alkyl group, preferably methyl, ethyl or isobutyl, in particular methyl, and n denotes an integer from 4 to 20, preferably 10 to 20.

The aluminoxane can be prepared in various ways.

In one of the processes, finely powdered copper sulfate pentahydrate is slurried in toluene, and sufficient trialkylaluminum is added in a glass flask under an inert gas at about −20° C. so that about 1 mole of CuSO$_4$.5-H$_2$O is available for each 4 Al atoms. After slow hydrolysis with elimination of alkane, the reaction mixture is left at room temperature for 24 to 48 hours, cooling sometimes being necessary so that the temperature does not exceed 30° C. The aluminoxane dissolved in toluene is subsequently separated from the copper sulfate by filtration, and the toluene is removed by distillation in vacuo. It is assumed that the low-molecular-weight aluminoxanes condense in this preparation process to form higher oligomers with elimination of trialkylaluminum.

In addition, aluminoxanes are obtained when trialkylaluminum, preferably trimethylaluminum, dissolved in an inert aliphatic or aromatic solvent, preferably heptane or toluene, is reacted at a temperature of from −10 to 100° C. with aluminum salts, preferably aluminum sulfate, containing water of crystallization. In this case, the volume ratio between the solvent and the alkylaluminum used is 1:1 to 50:1—preferably 5:1—and the reaction time, which can be monitored by elimination of the alkane, is 1 to 200 hours—preferably 10 to 40 hours.

Of the aluminum salts containing water of crystallization, those are preferred, in particular, which have a high content of water of crystallization. Aluminum sulfate hydrate is particularly preferred, above all the compounds Al$_2$(SO$_4$)$_3$.18H$_2$O and Al$_2$(SO$_4$)$_3$.16H$_2$O having the particularly high water of crystallization content of 18 and 16 moles of H$_2$O/ mole of Al$_2$(SO$_4$)$_3$ respectively.

The following is an example of the preparation of methylaluminoxane: 37.1 g of Al$_2$(SO$_4$)$_3$.18H$_2$O (0.056 mol, corresponding to 1 mol of H$_2$O) were suspended in 250 cm$^3$ of toluene, 50 cm$^3$ of trimethylaluminum (0.52 mol) were added, and the reaction was carried out at 20° C. After a reaction of 30 hours, about 1 mole of methane had been evolved. Solid aluminum sulfate was subsequently removed from the solution by filtration. 19.7 g of methylaluminoxane were obtained by stripping off the toluene. The yield was 63% of theory. The mean molecular weight, determined cryoscopically in benzene, was 1170. The number of

units worked out at 20.2.

However, the mean degree of oligomerization was about 20.

Finally, it is also possible to produce the aluminoxane directly in the polymerization reactor by reacting a trialkylaluminum, preferably trimethylaluminum, with water in the ratio 1:1 mol/mol before adding the metallocene.

The catalyst to be used according to the invention is employed for polymerization of ethylene and for copolymerization of ethylene with 1-olefins of the formula RCH=CH$_2$, in which R denotes a straight-chain or branched alkyl radical having 1 to 12 carbon atoms, preferably 1 to 6 carbon atoms, for example propylene, 1-butene, 1-hexene, 4-methyl-1-pentene and 1-octene. Particularly preferred 1-olefins are 1-butene, 1-hexene and 4-methyl-1-pentene. The proportion of ethylene is 90 to 99 mol-%, and the proportion of the comonomer is 1 to 10 mol-%.

The polymerization is carried out in a known manner in suspension or in the gas phase, continuously or batchwise, in one or more steps, at a temperature of from 20° to 100° C., preferably 70° to 90° C. The pressure is 0.5 to 64 bar. The polymerization is preferred in the pressure range of from 5 to 64 bar which is particularly interesting in industry.

In this process, the transition-metal component is used in a concentration, based on the transition metal, of from 10$^{-5}$ to 10$^{-7}$, preferably 10$^{-5}$ to 10$^{-6}$ mol of Ti, Zr or Hf per dm$^3$ of solvent or per dm$^3$ of reactor volume. The aluminoxane is used in a concentration of from 2×10$^{-3}$ to 5×10$^{-3}$, preferably 2×10$^{-3}$ to 3×10$^{-3}$, mol per dm$^3$ of solvent or per dm$^3$ of reactor volume, based on the content of aluminum. In principle, however, higher concentrations are also possible.

The polymerization is carried out in the gas phase or in an inert solvent which is customary for the lowpressure Ziegler process, for example in an aliphatic or cycloaliphatic hydrocarbon; examples which may be mentioned are butane, pentane, hexane, heptane, isooctane, cyclohexane and methylcyclohexane. In addition, it is possible to use a petroleum or hydrogenated diesel oil fraction which has been carefully freed from oxygen, sulfur compounds and moisture. Toluene can also be used.

Surprisingly, it has been shown that the catalyst to be used according to the invention is very sensitive to hydrogen, and that the yield is not reduced, but in contrast is increased, by hydrogen. The molecular weight of the polyethylene wax is therefore regulated by means of hydrogen, which is introduced into the polymerization vessel in the small amount of from 1 to 20, preferably 1 to 10,% by volume, based on ethylene.

The polyethylene wax according to the invention is produced in the form of round grains having a high bulk density of from about 200 to 400 g/dm$^3$; it is separated from the solvent, if appropriate, and dried.

The polyethylene wax has a molecular weight of from about 2,000 to about 10,000, preferably about 3,000 to about 6,000. The molecular weight distribution $M_w/M_n$ is extremely narrow and is about 2 to 10, with the value being about 2 to 5 when an aluminoxane obtained by the aluminum sulfate method is used. When an aluminoxane produced in situ from trialkylaluminum with water is used, $M_w/M_n$ is about 5 to 10. The viscosity number of the wax is in the range 20 to 60 cm$^3$/g. As a consequence of the high crystallinity and the narrow molecular weight distribution, the melting range of the wax is likewise very narrow; it is about 129° to 131° C. for a homopolymer and about 120° to 126° C. for a copolymer. The wax has a density of from about 0.93 to about 0.97, preferably 0.940 to 0.960, g/cm$^3$, and the bulk density is generally greater than 250 g/dm$^3$.

Due to the extreme hydrogen sensitivity of the catalyst used, the process according to the invention allows waxes to be produced at relatively low process temperatures and very low hydrogen partial pressure. In the copolymerization, the comonomer is incorporated into the main chain randomly and uniformly. The incorporation rate is high, meaning that it is only necessary to supply sufficient comonomer as is actually copolymerized, which has economic advantages.

Due to its narrow molecular weight distribution, the polyethylene wax according to the invention has greater hardness than known polyethylene waxes and is therefore particularly highly suitable for increasing the abrasion and scouring resistance of printing inks and for improving the surface quality of surface coatings.

EXAMPLE 1

100 dm$^3$ of diesel oil were introduced into a 150 dm$^3$ capacity reactor and conditioned at 85° C. $1 \times 10^{-3}$ mol of bis(cyclopentadienyl)zirconium dichloride and 1.043 mol of methylaluminoxane from the Al sulfate process were initially introduced with stirring. 150 dm$^3$ (s.t.p.) of hydrogen were subsequently introduced over the course of 30 minutes, and ethylene was introduced to a final pressure of 7 bar. The reaction duration was 4 hours.

Yield: 11 kg
Catalyst yield (CY): 11kg/mmol of Zr
Bulk density: 330 g/dm$^3$
Viscosity number: 32 cm$^3$/g
$M_w/M_n$: 3.8
Melting point (DSC): 129°-131° C.

EXAMPLE 2

Example 1 was modified by using only 0.345 mol of methylaluminoxane and introducing 200 dm$^3$ (s.t.p. of hydrogen over the course of 40 minutes.
Yield: 16.4 kg
CY: 16.4 kg/mmol of Zr
Bulk density: 250 g/dm$^3$
Viscosity number: 25 cm$^3$/g
$M_w/M_n$: 4
Melting point (DSC): 129°-131° C.

EXAMPLE 3

100 dm$^3$ of diesel oil were initially introduced at 85° C. 1.043 mol of trimethylaluminum were reacted with 1 of H$_2$O with stirring. This prereaction lasted 15 minutes. 1 mmol of bis(cyclopentadienyl)zirconium dichloride were subsequently metered in, and 200 dm$^3$ s.t.p.) of H$_2$ were introduced over the course of 40 minutes. Ethylene was then introduced to a final pressure of 7 bar.
Polymerization time: 4 hours
Yield 13.6 kg
Bulk density: 275 g/dm$^3$
Viscosity number: 40 cm$^3$/g
$M_w/M_n$: 6
Melting point (DSC): 129°-131° C.

EXAMPLE 4

As for example 3, but only continuous introduction of a gas mixture containing 5% of hydrogen.
Yield: 19 kg
CY: 19 kg/mmol of Zr
Bulk density: 175 g/dm$^3$
Viscosity number: 31 cm$^3$/g
$M_w/M_n$: 3.1
Melting point (DSC): 129°-131° C.

EXAMPLE 5

Analogous to Example 4, but only 1.5 mmol of Zr.
Yield: 16.5 kg
CY: 11.6 kg/mmol of Zr
Bulk density: 253 g/dm$^3$
Viscosity number: 35 cm$^3$/g
$M_w/M_n$: 6.2
Melting point (DSC): 129°-131° C.

EXAMPLE 6

As for Example 4, but only 0.345 mol of methylaluminoxane (from the Al sulfate process) and 10% of H$_2$.
Yield: 16.5 kg
CY: 17.8 kg/mmol of Zr
Bulk density: 285 g/dm$_3$
Viscosity number: 27 cm$^3$/g
$M_w/M_n$: 2.8.
Melting point: 129°-131° C.

EXAMPLE 7

As for Example 6, but with addition of 1,600 cm$^3$ of butene.
Yield: 15.9 kg
Bulk density: 312 g/dm$^3$
Viscosity number: 19 cm$^3$/g
$M_w/M_n$: 2.8
Melting point: 124°-125° C.

I claim:
1. A process for the preparation of a polyethylene wax comprising units derived from ethylene, having a molecular weight of from about 2,000 to about 10,000, a molecular weight distributon $M_w/M_n$ of from about 2 to 10, a viscosity number of from 20 to 60 cm$^3$/g, a melting range from about 129° to 131° C. for a homopolymer and about 120° to 126° C. for a copolymer, and a density of from 0.93 to 0.97 g/cm$^3$ and a bulk density of from 200 to 400 g/dm$^3$ by polymerization of ethylene or copolymerization of ethylene with a 1-olefin of the formula R-CH=CH$_2$ in which R denotes a straight-chain or branched alkyl radical having 1 to 12 carbon atoms, at a temperature of from 20° to 100° C., a pressure of from 0.5 to 64 bar, in solution, in suspension or in the gas phase, in the presence of a catalyst comprising a metallocene as the transition metal component and an aluminoxane as the activator, which comprises carrying out the polymerization in the presence of a catalyst whose transition-metal component is bis(cyclopentadienyl)-dimethylzirconium or bis(cyclopentadienyl)-zirconium dichloride, wherein the aluminoxane is one of the formula I

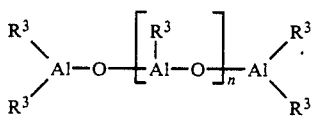
(I)

for the linear type and/or of the formula II

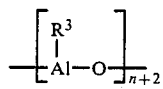
(II)

for the cyclic type, where, in the formulae I and II, R$^3$ denotes a C$_1$-C$_6$-alkyl group and n is an integer from 2 to 40, and wherein hydrogen is present in an amount of from 1 to 20% by volume, based on ethylene.

2. A process for the preparation of a polyethylene wax comprising units derived from ethylene, having a molecular weight of from about 2,000 to about 10,000, a molecular weight distribution M$_w$/M$_n$ of from about 2 to 10, a viscosity number of from 20 to 60 cm$^3$/g, a melting range from about 129° to 131° C. for a homopolymer and about 120° to 126° C. for a copolymer, and a density of from 0.93 to 0.97 g/cm$^3$ and a bulk density of from 200 to 400 g/dm$^3$ by polymerization of ethylene or copolymerization of ethylene with a 1- olefin of the formula R-CH=CH$_2$ in which R denotes a straight-chain or branched alkyl radical having 1 to 12 carbon atoms, at a temperature of from 20° to 100° C., a pressure of from 0.5 to 64 bar, in solution, in suspension or in the gas phase, in the presence of a catalyst comprising a metallocene as the transition-metal component and an aluminoxane as the activator, which comprises carrying out the polymerization in the presence of a catalyst whose transition-metal component is a component of the following formula:

(cyclopentadienyl)$_2$MRHal
wherein:
R is a cyclopentadienyl radical, or C$_1$-C$_6$-alkyl radical, or halogen,
M is a titanium, zirconium, hafnium, and Hal is a halogen, wherein the aluminoxane is one of the formula I

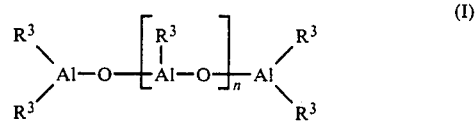
(I)

for the linear type and/or of the formula II

(II)

for the cyclic type, where, in the formulae I and II R$^3$ denotes a C$_1$-C$_6$-alkyl group and n is an integer from 2 to 40, and wherein hydrogen is present in an amount of from 1 to 20% by volume, based on ethylene.

3. A process for the preparation of a polyethylene wax comprising units derived from ethylene, having a molecular weight of from about 2,000 to about 10,000, a molecular weight distribution M$_w$/M$_n$ of from about 2 to 10, a viscosity number of from 20 to 60 cm$^3$/g, a melting range from about 129° to 131° C. for a homopolymer and about 120° to 126° C. for a copolymer, and a density of from 0.93 to 0.97 g/cm$^3$ and a bulk density of from 200 to 400 g/dm$^3$ by polymerization of ethylene or copolymerization of ethylene with a 1-olefin of the formula R-CH=CH$_2$ in which R denotes a straight-chain or branched alkyl radical having 1 to 12 carbon atoms, at a temperature of from 20° to 100° C., a pressure of from 0.5 to 64 bar, in solution, in suspension or in the gas phase, in the presence of a catalyst comparing a metallocene as the transition-metal component and an aluminoxane as the activator, which comprises carrying out the polymerization in the presence of a catalyst whose transition-metal component is of the following formula:

(cyclopentadienyl)$_2$ MRHal.
wherein:
R is chlorine,
M is zirconium, and
Hal is chlorine,
wherein the aluminoxane is one of the formula I

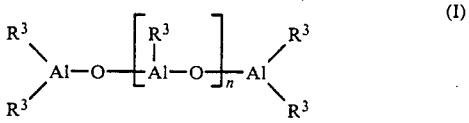
(I)

for the linear type and/or of the formula II

(II)

for the cyclic type, where, in the formulae I and II, R$^3$ denotes a C$_1$-C$_6$-alkyl group and n is an integer from 2 to 40, and wherein hydrogen is present in an amount of from 1 to 20% by volume, based on ethylene.

* * * * *